United States Patent
Rathmacher

(10) Patent No.: US 9,085,240 B2
(45) Date of Patent: Jul. 21, 2015

(54) HIGH VOLTAGE MODULE WITH CIRCUIT BREAKER FOR MOTOR VEHICLES

(71) Applicant: GM GLOBAL TECHNOLOGY OPERATIONS LLC, Detroit, MI (US)

(72) Inventor: Ralf Rathmacher, Schmitten Im Taunus (DE)

(73) Assignee: GM Global Technology Operations LLC, Detroit, MI (US)

( * ) Notice: Subject to any disclaimer, the term of this patent is extended or adjusted under 35 U.S.C. 154(b) by 225 days.

(21) Appl. No.: 13/800,541

(22) Filed: Mar. 13, 2013

(65) Prior Publication Data

US 2013/0258607 A1 Oct. 3, 2013

(30) Foreign Application Priority Data

Mar. 29, 2012 (DE) .......................... 10 2012 006 488

(51) Int. Cl.
*B60L 3/04* (2006.01)
*B60L 3/00* (2006.01)
*G01R 31/02* (2006.01)

(52) U.S. Cl.
CPC ................. *B60L 3/04* (2013.01); *B60L 3/0007* (2013.01); *B60L 3/0046* (2013.01)

(58) Field of Classification Search
CPC ............................... B60L 3/04; B60L 3/0046
USPC .................................................. 324/537, 424
See application file for complete search history.

(56) References Cited

U.S. PATENT DOCUMENTS

| | | | | | |
|---|---|---|---|---|---|
| 5,971,801 | A | * | 10/1999 | Kato et al. | 439/511 |
| 6,366,449 | B1 | * | 4/2002 | Hashizawa et al. | 361/642 |
| 6,746,275 | B2 | * | 6/2004 | Yamakawa et al. | 439/507 |
| 6,755,673 | B2 | * | 6/2004 | Fukushima et al. | 439/157 |
| 6,982,393 | B2 | * | 1/2006 | Matsui et al. | 200/335 |
| 7,749,005 | B2 | * | 7/2010 | Titokis et al. | 439/157 |
| 7,872,206 | B2 | * | 1/2011 | Matsunaga et al. | 200/335 |
| 7,915,753 | B2 | * | 3/2011 | Endo et al. | 307/10.1 |
| 8,379,375 | B2 | * | 2/2013 | Furuya et al. | 361/642 |
| 8,643,224 | B2 | * | 2/2014 | Kim | 307/326 |
| 8,854,797 | B2 | * | 10/2014 | Ikeda et al. | 361/643 |
| 2011/0127154 | A1 | * | 6/2011 | Oh et al. | 200/565 |
| 2013/0088798 | A1 | * | 4/2013 | Ikeno et al. | 361/1 |

* cited by examiner

*Primary Examiner* — Adrian S Wilson
*Assistant Examiner* — Izak Baranowski
(74) *Attorney, Agent, or Firm* — John A. Miller; Miller IP Group, PLC

(57) ABSTRACT

The invention relates to a high voltage module for motor vehicles. The high voltage module includes a manually operated circuit breaker in a module housing which is disposed in a socket of the module housing. By removing the circuit breaker from the socket, at least one high voltage cable within the module housing is interrupted. A manually operated tool with a plug-type housing adapted to the socket includes a pivotable cover. The pivotable cover can assume an opened and a closed position. The tool includes at least one measuring lead which is connected to the at least one high voltage cable and a measuring terminal in the plug-type housing.

14 Claims, 4 Drawing Sheets

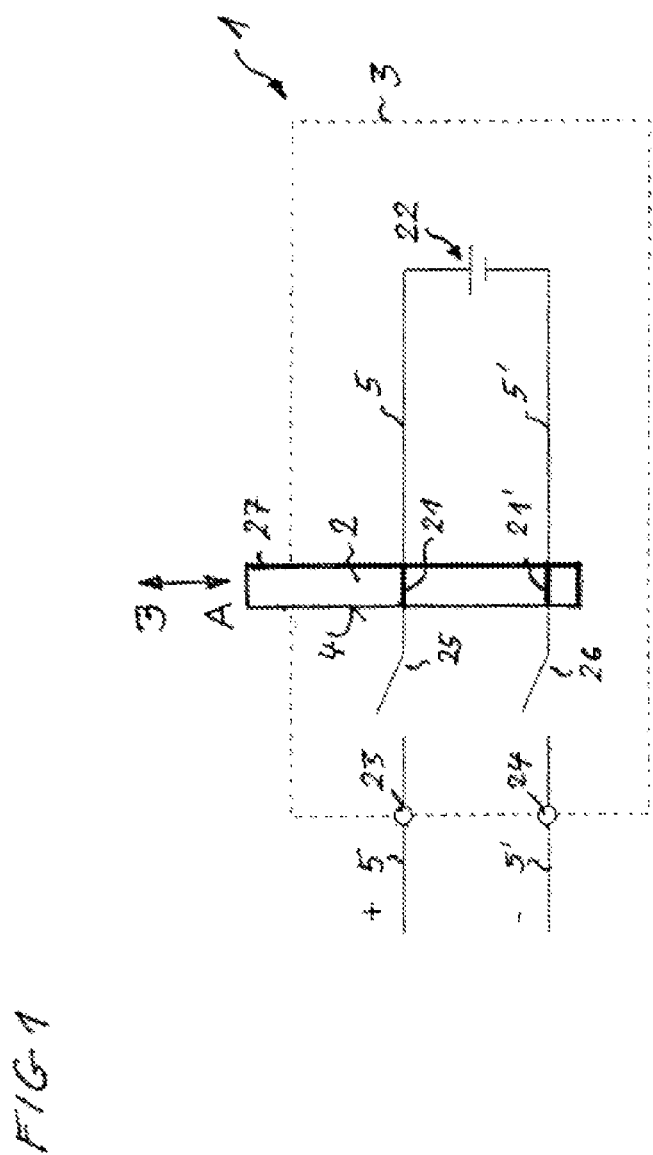

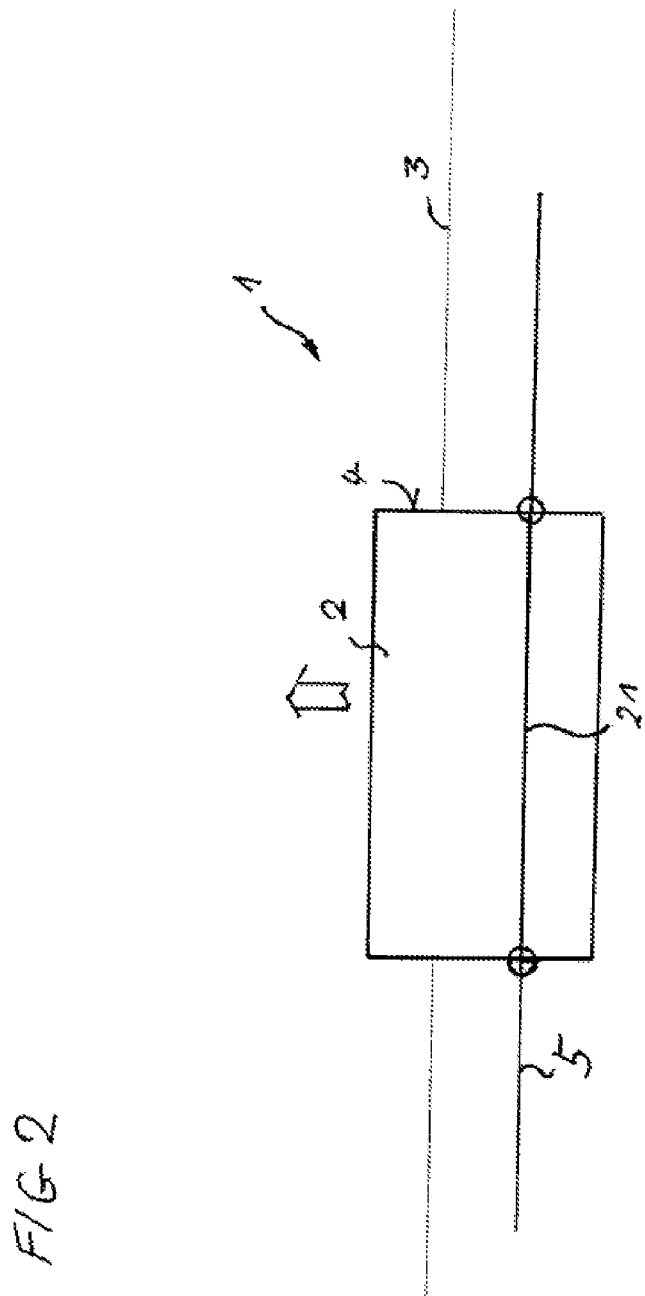

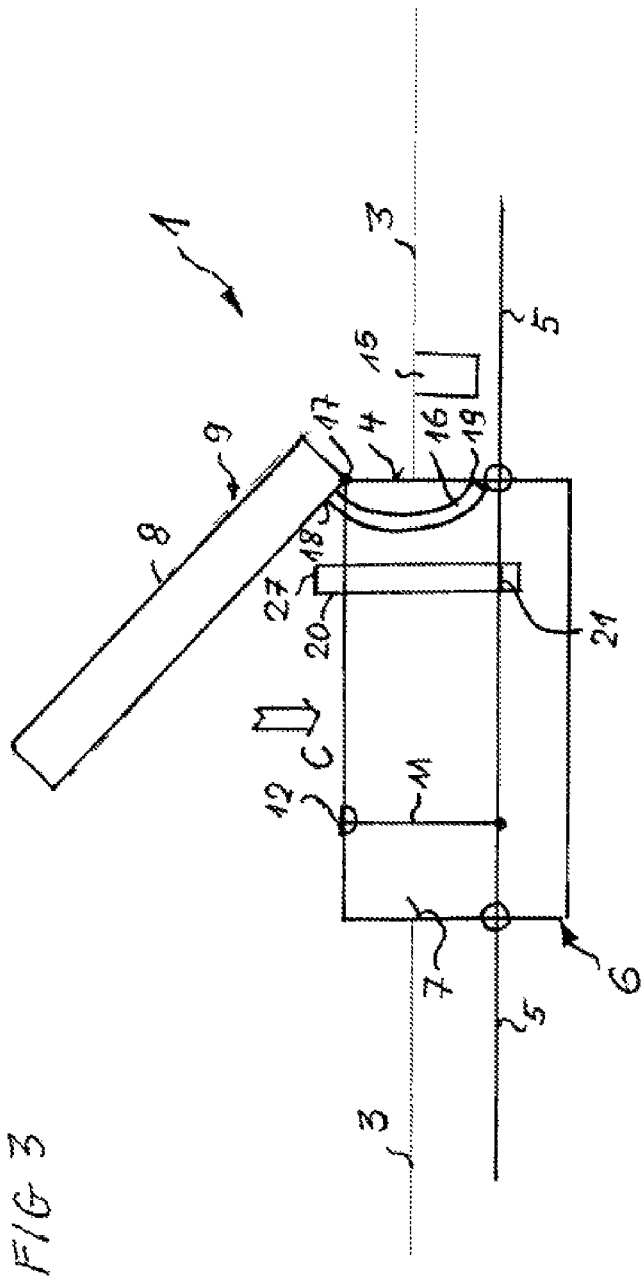

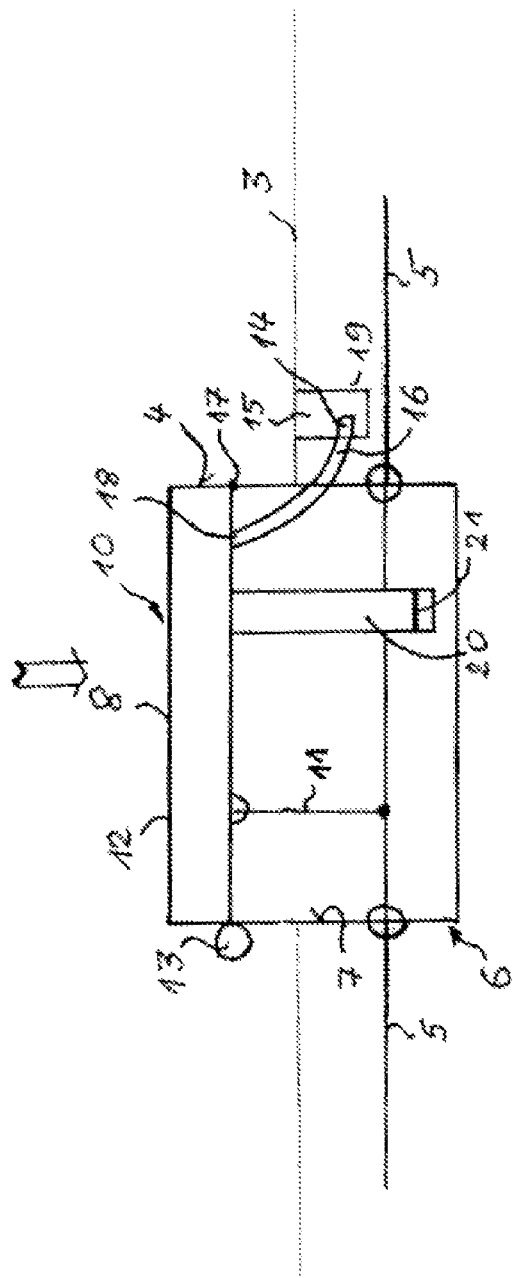

HIGH VOLTAGE MODULE WITH CIRCUIT BREAKER FOR MOTOR VEHICLES

A high voltage module with a circuit breaker for motor vehicles is described. The high voltage module includes a manually operated circuit breaker in a module housing which is disposed in a socket of said module housing. By removing the circuit breaker from the socket, at least one high voltage cable within the module housing is interrupted.

A device for protecting against contact with electrically live parts is known from the publication DE 10 2009 011 169 A1. The live parts are located in a connection compartment of an electrical system, whereby the connection compartment is accessed via a removable closure part. The closure part is secured in the locking system by means of a locking element and the locking element can be adjusted from outside the connection compartment. The locking element interacts with a jumper connection, which is active inside the connection compartment and which comes into contact with two or more sparking contacts, at which contacts the live components of differing polarities are disposed when the locking element is set to the opened position by the actuating member.

Protection of this kind from contact with live components is particularly essential in new hybrid drives in motor vehicles when the latter require maintenance or repair in vehicle repair shops. In order to prevent high currents, hybrid drives of this type operate at a high voltage that exceeds a voltage of 50 V, which is a departure from the voltage range of below 50 V considered safe. In motor vehicle drives the operating voltages, given the high drive power, lie in a high voltage range of between 50 V and 1000 V, and therefore above the lower voltage range of up to 50 V considered safe and below the range of high voltages starting at 1 kV. Given such a high operating voltage in hybrid vehicles, protection from direct or indirect contact with live modules is essential. Such protection is intended to safeguard service personnel in vehicle repair shops from the dangers of an electric shock in cases of maintenance or repair, especially since it must be assumed that shop personnel are preferably familiar with problems of a mechanical and gas-dynamic nature.

A primary source of dangerous voltages in motor vehicles with hybrid drives is batteries, which consist not only of battery systems or fuel cells, but can also include charged capacitors, such as dual-layer capacitors. Even DC intermediate circuits of the converter system for the electric motor between the three-phase machine and the DC voltage accumulators constitute modules which can have stored relatively high voltages for some time after the drive system is switched off, and therefore, like a storage battery module, represent a potential danger to service personnel. Even in the case of accidents, defects in the electrical system can arise which must be contended with without endangering humans.

To that end, it is known to provide manually operated circuit breakers for high voltage modules, which are arranged in the electrical outlets of the module housing and which can be quickly and safely removed by unplugging from the socket, thereby interrupting live high voltage cables. However, during maintenance and repair it is necessary to test the functionality of the electrical equipment and systems even under high voltage.

It is therefore an object to create a high voltage module with a circuit breaker for motor vehicles which enables testing of the functions of the motor vehicle systems under high voltage while ensuring enhanced safety even when the circuit breaker is removed.

The object is achieved by the subject matter of independent claim 1. Advantageous modifications are set forth in the dependent claims.

In one embodiment of the invention a high voltage module includes a manually operated circuit breaker inside a module housing, which is arranged in a socket of said module housing. Removing the circuit breaker from the socket interrupts at least one high voltage cable within the module housing. A manually operated tool with a plug-type housing adapted to the socket also includes a pivotable cover. The pivotable cover can assume an open and a closed position. The tool includes at least one measuring lead which is connected to the at least one high voltage cable, and a measuring terminal in the plug-type housing.

One advantage of the high voltage module is that with the aid of the tool adapted to the socket, it creates the possibility of using the tool during servicing to bridge in a controlled manner a connection that is normally interrupted when retracting the circuit breaker, wherein at the same time an electric potential is now applied via the measuring lead at the measuring terminal. In this way, it is possible for appropriately trained personnel using the tool to conduct in an advantageous manner measurements and functional tests under high voltage on the corresponding module and connecting systems. However, the measuring terminal is only accessible if the pivotable cover of the tool is in the opened position. Thus, for electrical service personnel it is possible, by pivoting the pivotable cover to the closed, covered position, to bar unauthorized personnel access to the measuring terminal, particularly since the measuring terminal is exposed only as long as the cover is in the opened position.

A high voltage module of this type with circuit breaker can also be provided for already known breaker devices, such as for example, a manual switch.

Associated with the at least one measuring terminal and the at least one high voltage cable is preferably a positive high voltage cable and a negative high voltage cable, both of which are interrupted when the circuit breaker is removed, and both of which are connected to the high voltage module upon introduction and insertion of the plug-type housing of the tool when the cover is opened, and are simultaneously connected by positive and negative measuring leads to corresponding positive and negative measuring terminals.

In a preferred embodiment of the invention the tool, when inserted in the socket and when the cover is opened, on the one hand connects the at least one high voltage cable of the high voltage module to the at least one measuring lead and exposes the measuring terminal. In this way it is possible to inspect the condition and functionality of the high voltage module under high voltage when the cover is opened.

On the other hand the tool, when plugged into the socket and with the cover in the closed position, is locked into the module housing and with the cover in the closed position, the at least one high voltage cable of the high voltage module is interrupted. Thus, with the service tool the potential exists for the electrical service personnel that unauthorized personnel cannot intentionally or mistakenly come into contact with the measuring points. Moreover, with the cover in the closed position, both the positive as well as the high voltage cable are interrupted, so that the closed cover is a signal that service mechanics can safely work on the vehicle.

Moreover, in another preferred embodiment of the invention the cover of the tool, the tool itself or both are fitted with an eyelet for attaching a lock with the cover in the closed position. In this way, only service personnel who have a key to the tool, are able to perform measurements, inspections or tests on the high voltage module under high voltage.

In addition, in another embodiment of the invention, the cover when in the closed position interacts with a locking mechanism that engages an abutment of the module housing. In this embodiment, the tool itself cannot be removed, even accidentally, by unauthorized personnel as long as the tool is plugged into the socket and the cover is in the closed position, since in order to remove the tool from the high voltage module it is necessary to lift up or swing open the cover.

In a further embodiment of the invention, the locking device includes a curved bracket which is arranged spaced apart from a pivot axis of the cover. This curved bracket preferably includes a circular segment, the midpoint of which is situated in the pivot axis so that a segment equal to the cross-section of the bracket extends out into the high voltage module housing, in order to produce a reliable locking action.

In addition, it is provided that a fixed end of the curved bracket is materially fixed to the cover at a distance from the pivot axis that corresponds to the radius of the circular segment. The associated free end of the curved bracket is positioned in the tool when the cover is in the opened position and it projects from the tool and into the abutment of the module housing when the cover is in the closed position.

However, differently designed locking devices are also conceivable, for example, movable bars that move outwardly when the cover is closed.

It is further provided that the tool includes a resilient, pre-tensioned pin made of an electrically insulating material with at least one electrically conductive high voltage segment, preferably with two electrically conductive high voltage segments for a positive and a negative high voltage cable. In addition, the positions of the pivotable cover are transmitted mechanically to the pin.

That means that when the cover of the tool is in the opened position, the electrically conductive high voltage cable segments for the positive and negative high voltage cable are connected. Conversely, if the cover is closed, the resilient, pre-tensioned pin interrupts the high voltage cables in that corresponding high voltage cable segments for interrupting the high voltage cables with the aid of the pre-tensioned pin are separated from said latter cables, thereby preventing the temporary bridging which is part of the measuring technology.

As previously mentioned, high voltage modules of this type with a power switch for motor vehicles are used, in particular, for motor vehicles with hybrid drives.

A method for functionally testing a high voltage module under high voltage includes the following method steps. First, a manually operated circuit breaker is removed from a socket, thereby interrupting at least one high voltage cable within the module housing of the high voltage module. Next, a manually operated tool with a plug-type housing adapted to the socket which includes a pivotable cover, is inserted with the cover in the opened position into the socket, thereby connecting the interrupted at least one high voltage cable. For that reason, the cover must be inserted in the opened position so that the locking device provided is not obstructing when the plug-type housing of the tool is pushed in. It is then possible using the tool to measure the condition of the high voltage module via at least one measuring lead and one measuring terminal in the plug-type housing when the cover is in the opened position. If it is necessary to temporarily interrupt the electrical inspections and tests of the system when high tension voltage is present, then the cover can be moved to the closed position, which affords the service personnel the additional possibility of reliably securing access from outside contact by attaching a lock to the eyelets of the tool.

An embodiment of the invention is described in greater detail below with reference to the appended figures.

FIG. 1 shows a schematic diagram of a high voltage module, using as an example a high voltage battery with a manually operated circuit breaker;

FIG. 2 shows another schematic diagram of the circuit breaker of a battery for interrupting at least one high voltage cable;

FIG. 3 shows a schematic diagram of a service tool which is inserted in a module housing or in a battery housing after the circuit breaker has been removed;

FIG. 4 shows a schematic diagram of the service tool according to FIG. 3 which is secured in several ways from switching back on.

FIG. 1 shows a schematic diagram of a high voltage module 1 with a high voltage battery 22 in a battery or module housing 3. On the module housing 3 a positive high voltage cable 5 and a negative high voltage cable 5' can be connected to a corresponding positive battery terminal 23 and a corresponding negative battery terminal 24. Arranged within the module housing 3 are high voltage contactors 25 for the positive high voltage cable 5 and 26 for the negative high voltage cable 5'. These high voltage contactors 25 and 26 automatically interrupt the high voltage of the high voltage battery 22 when the vehicle is inoperative. As an additional safeguard, a manually operated circuit breaker 2 is disposed in a socket 4 in the module housing 3, which by pressing on a button 27 in the direction of the arrow A interrupts the positive high voltage cable 5, regardless of the position of the high voltage contactor 25, and the negative high voltage cable 5', regardless of the position of the high voltage contactor 26, and which can be removed from the module housing 3 in the direction of the arrow B, as a result of which the high voltage cable segment 21 of the positive high voltage cable 5 and 21' of the negative high voltage cable 5' are removed when the circuit breaker 2 is withdrawn from the socket 4. This ensures that the positive high voltage cable 5 and the negative high voltage cable 5' are interrupted during assembly, maintenance or repairs.

In the following FIGS. 2 to 4 the details of the high voltage module 1 with circuit breaker 2 for motor vehicles are discussed with reference to the interruption of at least one high voltage cable, wherein the interruption of the high voltage cable and a bridging of the high voltage cable using a service tool can be employed for both a positive as well as for a negative high voltage cable 5 and 5'.

FIG. 2 shows a further schematic diagram of the circuit breaker 2 on a battery for interrupting at least one high voltage cable 5. For this purpose, the circuit breaker 2 is designed as a plug that can be withdrawn from the socket 4 of the module housing 3. Upon withdrawal a high voltage cable segment 21 is withdrawn with the circuit breaker 2 and the high voltage cable 5 is interrupted.

For purposes of electrical servicing, measuring or inspecting, a service tool 6, as shown in FIG. 3, can be inserted into the socket 4 of the module housing 3 when the pivotable cover 8 provided for the service tool 6 is in the opened position, as shown in FIG. 3. In this position, the service cover 8 of the service tool 6 is pivoted about a pivot axis 17 in such a way that a resilient, pre-tensioned pin 20 together with a high voltage cable segment 21 bridges the interrupted high voltage cable 5, and additionally, with the service cover 8 of the service tool 6 in the opened position, exposes a measuring lead 11 connected to the high voltage cable 5 and a measuring terminal 12.

In this way, it is possible to measure battery function, for example, under operating voltage. It is also possible for electrical service personnel to perform additional measurements under voltage on the vehicle for different high voltage modules when the contactors 25 and 26 are enabled, as shown in FIG. 1. If inspecting and measuring are temporarily interrupted, for example, the service cover 8 of the service tool 6 can be pivoted about pivot axis 17 and thereby ensure that no unauthorized personnel are able to reach the measuring terminal 12.

By pivoting the service cover 8 into the closed position, the resilient, pre-tensioned pin 20 and its button 27 are pressed downward when the cover is closed. By lowering the high voltage cable segment 21 together with the pin 20 within the service tool, the high voltage cable 5 is interrupted and the high voltage module is disconnected from voltage, as shown in following FIG. 4.

FIG. 4 shows a schematic diagram of the service tool 6 according to FIG. 3 which is secured in several ways from switching back on. FIG. 4 shows clearly that the high voltage cable segment 21 is lowered, together with the pin 20, thereby interrupting the high voltage cable 5. Furthermore, with the cover 8 in this closed position 10, the measuring terminal 12 is also covered so that it is protected from unauthorized contact. In addition, when the service cover 8 is pivoted about pivot axis 17, a bracket 16 of a locking device 14 is disposed in an abutment 15 of the module housing 3, preventing the service tool 6 from being inadvertently removed from the socket 4.

Also provided on the service tool 6 is an eyelet 13 that cooperates with a lock, which ensures that the service cover 8 remains in the closed position 10 and the high voltage cable 5 is further safeguarded from being switched on again. To remove the service tool 6 from the socket 4 and to be able to insert it into the socket 4 for normal operation via a circuit breaker 2, as it is seen in FIG. 1 and FIG. 2, the lock in the eyelet 13 must first be opened, the service cover 8 must be moved to an opened position as shown in FIG. 3, so that the bracket 16 of the locking device 14 is pulled out of the abutment 15 when the service cover 8 is pivoted about pivot axis 17. Only then is it possible to remove the service tool 6 from the socket 4 and to insert the circuit breaker 2 as shown in FIG. 1 and FIG. 2.

Although at least one exemplary embodiment was shown in the foregoing description, various changes and modifications are possible. The cited embodiments are merely examples and are not intended as limiting in terms of scope of validity, applicability or configuration in any way. Rather, the foregoing description provides the person skilled in the art with a concept for converting at least one exemplary embodiment, wherein it is possible to make numerous modifications in the function and arrangement of the elements described in an exemplary embodiment without departing from the scope of the appended claims and their legal equivalents.

LIST OF REFERENCE NUMERALS

1 high voltage module
2 circuit breaker
3 module housing
4 socket
5 high voltage cable
5' high voltage cable
6 tool
7 plug-type housing
8 cover
9 opened position
10 closed position
11 measuring lead
12 measuring terminal
13 eyelet
14 locking device
15 abutment
16 bracket
17 pivot axis
18 fixed end
19 free end
20 pin
21 high voltage cable segment
21' high voltage cable segment
22 high voltage battery
23 battery terminal
24 battery terminal
25 high voltage contactor
26 high voltage contactor
27 button

The invention claimed is:

1. A high voltage module for motor vehicles, comprising:
a module housing in which a manually operated circuit breaker is disposed in a socket of the module housing, which upon removal from the socket interrupts at least one high voltage cable within the module housing; and
a manually operated tool that includes a plug-type housing adapted to the socket, wherein the plug-type housing includes a pivotable cover capable of assuming an opened and a closed position, wherein the tool includes at least one measuring lead that is connected to the at least one high voltage cable and a measuring terminal in the plug-type housing, wherein the tool, upon insertion in the socket and with the cover in the opened position, connects the at least one high voltage cable and exposes the measuring terminal.

2. The high voltage module according to claim 1, wherein the tool, upon insertion in the socket and with the cover in the closed position, is locked in the module housing, and wherein with the cover in the closed position, the at least one high voltage cable is interrupted.

3. The high voltage module according to claim 1, wherein the cover of the tool includes an eyelet for attaching a lock with the cover in the closed position.

4. The high voltage module according to claim 1, wherein the cover cooperates with a locking device which engages an abutment of the module housing when the cover is in the closed position.

5. The high voltage module according to claim 4, wherein the locking device is a curved bracket which is arranged spaced apart from a pivot axis of the cover.

6. The high voltage module according to claim 5, wherein the curved bracket forms a circular segment, the midpoint of which is situated in the pivot axis.

7. The high voltage module according to claim 6, wherein a fixed end of the curved bracket is materially fixed to the cover at a distance from the pivot axis that corresponds to the radius of the circular segment.

8. The high voltage module according to claim 5, wherein a free end of the curved bracket is disposed in the tool when the cover is in the opened position.

9. The high voltage module according to claim 8, wherein the free end of the curved bracket projects from the tool and into the abutment of the module housing when the cover is in the closed position.

10. The high voltage module according to claim 1, wherein the tool includes a resilient, pre-tensioned pin made of an electrically insulating material with at least one electrically conductive high voltage segment, and wherein the positions of the pivotable cover can be transmitted mechanically to the pin.

11. The high voltage module according to claim 10, wherein the at least one high voltage cable segment of the resilient pre-tensioned pin bridges an interruption in the at least one high voltage cable in the tool when the cover is in the opened position.

12. The high voltage module according to claim 10, wherein the at least one high voltage cable segment of the resilient pre-tensioned pin prevents the interruption of the at least one high voltage cable in the tool from being bridged when the cover is in the closed position.

13. A method for functionally testing a high voltage module under high voltage, comprising:
   withdrawing a manually operated circuit breaker from a socket, thereby interrupting at least one high voltage cable within a module housing of the high voltage module;
   inserting a manually operated tool with a plug-type housing adapted to the socket, which includes a pivotable cover that when opened connects the interrupted at least one high voltage cable; and
   inspecting the condition of the high voltage module using at least one measuring lead and a measuring terminal in the plug-type housing.

14. A high voltage module for motor vehicles, comprising:
   a module housing in which a manually operated circuit breaker is disposed in a socket of the module housing, which upon removal from the socket interrupts at least one high voltage cable within the module housing; and
   a manually operated tool that includes a plug-type housing adapted to the socket, wherein the plug-type housing includes a pivotable cover capable of assuming an opened and a closed position, wherein the tool includes at least one measuring lead that is connected to the at least one high voltage cable and a measuring terminal in the plug-type housing, wherein the tool, upon insertion in the socket and with the cover in the closed position, is locked in the module housing, and wherein with the cover in the closed position, the at least one high voltage cable is interrupted.

* * * * *